United States Patent [19]

Sasaki

[11] Patent Number: 4,656,867

[45] Date of Patent: Apr. 14, 1987

[54] EARTHQUAKE FORECASTING METHOD

[76] Inventor: Youji Sasaki, 885 Oaza Hata, Yachihomura, Minamisakugen, Naganoken, Japan

[21] Appl. No.: 788,649

[22] Filed: Oct. 17, 1985

[30] Foreign Application Priority Data

Oct. 23, 1984 [JP] Japan .................. 59-221242

[51] Int. Cl.$^4$ .................. G01W 1/00; G01V 1/00
[52] U.S. Cl. .................. 73/170 R; 73/432.1
[58] Field of Search .................. 73/170 R, 432 R; 340/601

[56] References Cited

FOREIGN PATENT DOCUMENTS 0111081  6/1984  Japan .................. 340/601

OTHER PUBLICATIONS

C. Werner, "Automatic Cloud Cover Indicator System", J. Appl. Meteor., vol. 12, No. 8, Dec. 1973, p. 1394.

Primary Examiner—Charles A. Ruehl
Attorney, Agent, or Firm—Mason, Kolehmainen, Rathburn & Wyss

[57] ABSTRACT

An earthquake forecasting method comprises the steps of observing at least a Cirrus cloud of the thready shape which has grown above a geological trough, and tracing the extending direction and the end point of the Cirrus which is foreseeable as an epicenter of a future earthquake.

5 Claims, 1 Drawing Figure

U.S. Patent    Apr. 14, 1987    4,656,867
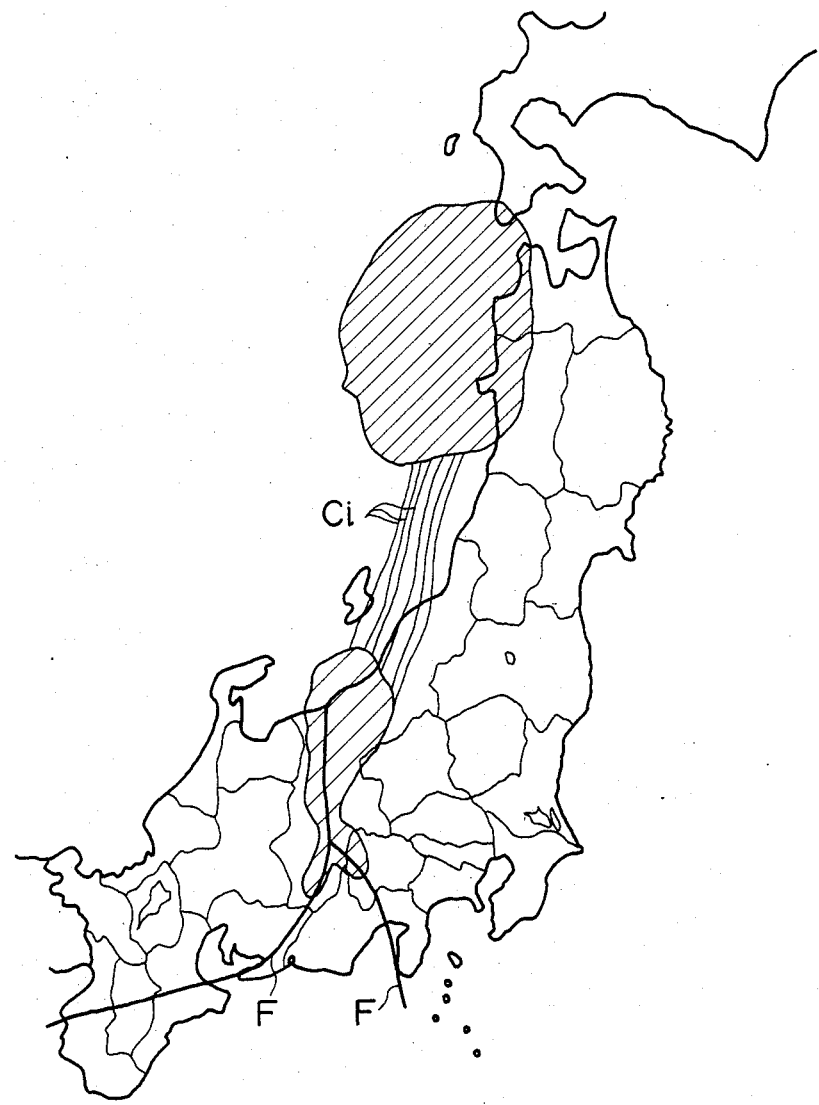

EARTHQUAKE FORECASTING METHOD

FIELD OF THE INVENTION

The present invention relates to an earthquake forecasting method for exactly foreseeing areas and the date of the occurrence of an earthquake.

BACKGROUND OF THE INVENTION

In the past, Japan has suffered from a vast number of great earthquakes, for instance, one of them struck Kanto area including Tokyo in 1923, another originated in the Japan sea and still another offshore in the Tokai district. These and all other big earthquakes killed and hurt many people and destroyed buildings and railways or other various structures, giving unestimated damages in the shocked areas. In order to avoid damages by an earthquake, many attempts have been made to foresee the occurrence of an earthquake in various aspects, for example, in view of measurement of crustal deformation in different places, volcanic activities or geophysical variations including changes of geomagnetism or earth-current. For the same purpose, there has been established in Japan a central forecasting system for anticipating the occurrence of a possible great earthquake in or near the territory of Japan.

To realize the geophysical mechanism of seismic shocks, seismologists have been trying to investigate the theories on origins of earthquakes in which it is said that so-called "Plate Tectonics" theory is the most promising in the seismology based on the elastic repulsion in the upper region of the crust. In accordance with this theory, the geophysical mechanism of seismic occurrence is that, when a plate constituting a part of the upper crust of about 40 kilometers in thickness slowly moves and creeps under the Japan archipelago, it pulls down a marginal portion of the archipelago crust, accumulating the elastic energy which subsequently causes the crust to rebound due to the elasticity upon release from the plate over a certain limitation of the elastic energy against the frictional force between the crusts, and to thereby bring abouut a great earthquake. Accordingly, this theory obviously means that all of the earthquakes should accidentally break out with faults in the crust of about 40 kilometers in thickness.

The above-mentioned theory involves an assumption that some crust variation occurs just before a great earthquake happens, and for that reason, seems to be rather unsuitable to predict a somewhat smaller earthquake of the magnitude less than 7 which may nevertheless cause a considerable damage. On the other hand, if the crust variation is measured under this theory, the observation network would require, in practice, a vast budget for installations and costs in observation of the crust variation, since the installations should be attached on the deep sea floor or in the deep underground without clear assurance of obtaining exact observation data.

Therefore, an object of the present invention is to provide an earthquake forecasting method capable of foreseeing occurrence of a future earthquake and the epicenter in a simple manner without expensive installations and many observers.

SUMMARY OF THE INVENTION

The present invention provides a new earthquake forecasting method which comprises combined steps of observing Cirrus, a cloud of the thready shape or Cirri clouds generated above a part of a great geological trough and observing the extending or floating direction of the clouds to forecast, with a considerable accuracy, a future earthquake and the epicenter which may occur within one to five days, especially a few days after Cirrus or Cirri are observed.

To predict a future earthquake in the present invention, Cirrus or Cirri, upper air clouds over 4 kilometers high which grows above a part of Fossa Magna, is observed and traced of its extending or floating direction and the end point which is foreseeable as an epicenter of a future earthquake. In observation of this end point from a position above the Cirrus or Cirri, it is representative of a mass of cloud or of a crossing of the Cirri which is confirmed by air or artificial satellite photographs or by television images reproduced from signals directly transmitted from a satellite. For clearer confirmation, an infrared ray detector may be used because infrared photographs are very sensitive to Cirrus.

It is known that the tidal motion gives a great influence on the inner pressure under the crust. Therefore, the tidal motion may possibly be taken into account for the observation results in prediction of an earthquake according to the present invention.

BRIEF DESCRIPTION OF THE DRAWING

The attached single FIGURE is a map of the main land of Japan showing Cirrus clouds which grew May 26, 1983 as set forth in Example 16 mentioned hereinafter.

EXAMPLES

In practice of the present invention, the inventor has been making, since June 1978, a continuous observation of Cirrus clouds at Yachiho-mura Minamisaku-gun, Nagano Prefecture in the central place of the main land of Japan. Cirrus includes the various cloud forms, namely, Cirrus fibratus, Cirrus uncinus, Cirrus spissatus, and Cirrus cumulobogenitus. The above-said observation point is located near Fossa Magna, a great trough traversing the main land of Japan from north to south direction.

The observation has been made over six years at that place and the inventor has been keeping accurate records of the relationship between Cirrus or Cirri and the corresponding earthquake day after day. As a result, Table 1 indicates typical 27 examples obtained from the observation data during Mar. 4, 1983 through Dec. 30, 1983 wherein "occurrence date of Currus cloud", "direction of Cirrus cloud", "earthquake occurrence date", "epicenter" and "magnitude" are tabulated. For instance, as shown in Example 1 of Table 1, the inventor observed Cirrus clouds extending from the observation point toward Tokyo and Kanagawa Prefecture on Mar. 4, 1983 and subsequently he was advised from the Meteorological Agency of Japan that an earthquake occurred the following day, Mar. 5, 1983 at the relatively small magnitude of 2.9 in the epicenter near Ohshima island at 34°55' lat. N and 193°13' long. E.

TABLE 1

| Example No. | Date (1983) Cirrus Occurrence | Direction of Cirrus Travelling | Date (1983) Earthquake Occurrence | Epicenter Area | Lat. N. | Long. E. | Magnitude |
|---|---|---|---|---|---|---|---|
| 1 | Mar. 4 | Kanagawa & Tokyo | Mar. 5 | Near Ohshima Is. | 34°55' | 193°13' | 2.9 |
| 2 | Mar. 7 | Ibaragi & Chiba | Mar. 8 | Southern part of Ibaragi | 35°59' | 139°59' | 3.9 |
| 3 | Mar. 9 | Tokyo & Ibaragi | Mar. 10 | Offing of Ibaragi | 36°45' | 141°23' | 4.8 |
| 4 | Mar. 12 | Chiba & Kanagawa | Mar. 13 | Northern part of Chiba | 35°44' | 140°20' | 3.9 |
| 5 | Mar.15-16 | Shizuoka | Mar. 16 | South-northern part of Shizuoka | 34°48' | 137°35' | 5.7 |
| 6 | Apr. 7 | Tokyo | Apr. 8 | Tokyo Bay | 35°23' | 139°39' | 4.2 |
| 7 | Apr. 9 | Shizuoka & Chiba | Apr. 15 | Near Ohshima Is. | 34°52' | 139°41' | 3.2 |
| 8 | Apr. 21 | Ibaragi & Tokyo | Apr. 24 | South-western part of Ibaragi | 36°03' | 139°56' | 4.5 |
| 9 | Apr. 26 | Ibaragi & Shizuoka | Apr. 29 | Eastern part of Shizuoka | 35°12' | 138°46' | 4.8 |
| 10 | May 10 | Saitama & Ibaragi | May 10 | Offing of Ibaragi | 36°25' | 140°41' | 3.8 |
| 11 | May 20 | Ibaragi & Chiba | May 21 | Eastern shore of Chiba | 35°15' | 140°24' | 5.2 |
| 12 | May 21 | Gunma & Ibaragi | May 22 | Southern part of Ibaragi | 36°00' | 140°25' | 4.4 |
| *13 | May 23 | Niigata | May 26 | Offing of Akita | 40°04' | 138°09' | 7.7 |
| 14 | June 1 | Ibaragi & Chiba | June 5 | Central part of Chiba | 35°38' | 140°14' | 3.8 |
| 15 | June 27 | Ibaragi | June 29 | Offing of Ibaragi | 36°44' | 141°06' | 4.7 |
| 16 | June 23 | Tochigi & Fukushima | July 2 | Offing of Fukushima | 36°54' | 141°07' | 5.8 |
| 17 | July 12 | Tokyo & Chiba | July 15 | Offing of Chiba | 35°21' | 141°08' | 4.3 |
| 18 | July 31 | Kanagawa & Yamanashi | Aug. 8 | Boarder of Kanagawa & Yamanashi | 35°32' | 139°01' | 6.0 |
| 19 | Aug. 29 | Tokyo & Ohshima Is. | Aug. 31 | Offing of Ohshima | 34°24' | 139°00' | 4.4 |
| 20 | Aug. 31 | Offing of Miyagi | Sept. 6 | Offing of Miyagi | 38°12' | 141°57' | 5.3 |
| 21 | Sept. 10 | Gunma & Yamanashi | Sept. 16 | Central part of Gunma | 36°23' | 138°45' | 4.5 |
| 22 | Sept. 26 | Ibaragi & its offing | Oct. 2 | Offing of Ibaragi | 36°27' | 141°09' | 4.7 |
| 23 | Oct. 13 | Nagano & Niigata | Oct. 16 | Niigata & its coast | 37°07' | 137°58' | 5.3 |
| 24 | Nov. 15 | Offing of Fukushima | Nov. 16 | Offing of Fukushima | 37°20' | 141°36' | 5.3 |
| 25 | Dec. 10 | Tochigi & Ibaragi | Dec. 11 | South-western part of Ibaragi | 36°15' | 140°08' | 4.3 |
| 26 | Dec. 29 | Near Ohshima & Hachijo Is. | Jan. 1 (1984) | Offing of Tokai | 33°16' | 136°59' | 7.4 |
| 27 | Dec. 30 | Niigata & northern Nagano | Jan. 1 (1984) | Northern part of Nagano | 36°53' | 138°18' | 4.4 |

*Central Japan Sea Earthquake

In Example 13, Cirrus clouds which were observed May 23, 1983 obviously showed a portent of a great earthquake which occurred with the magnitude of 7.7 on May 26, 1983 and broke out a great seismic tidal wave disaster along the shore facing the Japan Sea.

Table 1 discloses only a part of the observation results showing the relationship between Cirrus clouds and earthquakes obtained by the inventor over a long period of time. Therefore, it would be certain that the data show the objective existence of some geophysical correlation between Cirrus clouds and earthquakes. The detail of this correlation is now under deeper investigation by the inventor who is of the present opinion that Cirrus cloud particles which has grown just above Fossa Magna are drawn to a region where a vast earthquake energy is accumulated in the crust near the place to be an epicenter. The inventor firmly believes that the configuration of Cirrus clouds should be the ground to forecast the occurrence of earthquakes whatever physical correlation may exist between them.

It is clear that, when a Cirrus cloud is observed from only one place, the travelling or extending direction of Cirrus cloud and its leading end can not certainly be confirmed. To this end, multiple and simultaneous observations are desirable, but such a system will require many observers and a vast expense. Therefore, the present invention involves an upper air observation to confirm the end point of travelling Cirrus or Cirri by means of conventional air or artificial satellite photographs or television images. The upper air observation above a Cirrus cloud would provide materials to confirm the Cirrus end point where a mass of cloud is recognized as indicating the epicenter. The past observations reveals that several Cirrus clouds of the thready shape grow above Fossa Magna and they suggest the epicenter of a future strong eqrthquake at the crossing point of Cirrus where a mass of cloud is observed thereby facilitating the earthquake forecasting. Artificial satellite photographs are available in The Japan Meteorological Association in Tokyo. Otherwise, to confirm travelling Cirrus clouds, television images or photographs may be utilized by reproduction from signals directly transmitted from a satellite.

Referring now to the attached FIGURE, as also disclosed in Example 16, Cirrus clouds (Ci) of the elongated form grew May 26, 1983 above a part of Fossa Magna extending toward Niigata and Akita Prefectures for the future epicenter. The FIGURE indicates only one example, however, Cirri which grew before other earthquakes are shown in a similar way in drawings.

An earthquake may be considered to occur by a sudden crust variation and hence the lunar gravitation may be taken into account for an earthquake occurrence since it gives rise to a great influence on inner crust pressure. In other words, when geophysical energy is accumulated and at the same time an upper mantle below the crust is in an active condition, the term of occurrence of an earthquake is supposed to be expressed as the moon age from 7.5 to 15 days and also 22.5 days to the new moon. In this case, even though Cirrus clouds occur above a part of Fossa Magna, the outbreak of an earthquake is sometimes delayed until the time when the influence by succeeding lunar gravity increases because the earthquake energy is not accumulated enough to generate the crust variation.

On the other hand, considering an earthquake occurrence as a function of a geophysical plate deformation, the occurrence may be foreseen as Weibull distribution giving an anticipated longevity of products in quality control. In this case, there is statistically the highest chance of actual outbreak of an earthquake in one to four days after occurence of Cirrus clouds, and accordingly, the coefficients of Weibull distribution formula may be statistically calculated.

Also, in accordance with the present invention, infrared photographs or cameras may be used to obtain clearer images or pictures of Cirrus clouds which provide a clearer photograph or television image through infrared ray.

As mentioned above, the present invention provides a method capable of actually and exactly forecasting the occurrence of an earthquake which comprises the steps of observing Cirrus cloud generated above a part of a large geophysical trough, observing the direction of the travelling cloud, and confirming the end point of the cloud from the upper air so that even an earthquake of the relatively small magnitude may be forecasted by a simple manner without an expensive facilities and many observers.

What is claimed is:

1. An earthquake forecasting method comprising the steps of:
    observing Cirrus or Cirri of the elongated thready form which has grown above a great geological trough;
    tracing the extending direction and the end point of the Cirrus or Cirri; and
    confirming the end point of the Cirrus or Cirri from a position above said Cirrus or Cirri.

2. A method as defined in claim 1, said confirmation step being conducted by means of air photographs or television images.

3. A method as defined in claim 1, said confirmation step being conducted by means of artificial satellite photographs or television images.

4. A method as defined in claim 1, said Cirri form a crossing point which is foreseeable as an epicenter of a future earthquake, and a mass of cloud particles is observed at the crossing point.

5. A method as defined in claim 1, said confirmation step being carried out by infrared photographs to obtain an image of the Cirrus or Cirri.

* * * * *